2,749,324

PYRIMIDINE-ALDEHYDE RESINS

Henry A. Walter, Longmeadow, Mass., assignor to Monsanto Chemical Company, St. Louis, Mo., a corporation of Delaware No Drawing. Application April 12, 1952,
Serial No. 282,077

7 Claims. (Cl. 260—45.1)

This invention relates to new aminoplasts. More particularly, the invention relates to derivatives of 2,4,5-triamino-6-alkoxy pyrimidines.

One object of this invention is to provide new aminoplasts.

A further object is to provide resinous reaction products of 2,4,5-triamino-6-alkoxy pyrimidines.

Another object is to provide 2,4,5-triamino-6-alkoxy pyrimidine-aldehyde reaction products.

Still another object is to provide ethers of aldehyde 2,4,5-triamino-6-alkoxy pyrimidine reaction products.

These and other objects are obtained by reacting 2,4,5-triamino-6-alkoxy-pyrimidines with aldehydes to form thermosetting resins which may be further modified by reaction with organic hydroxy compounds.

The following examples are given in illustration and are not intended as limitations on the scope of this invention.

Example I

One mol of 2,4,5-triamino-6-methoxy-pyrimidine and 3 mols of formaldehyde in the form of a 37% solution in water were mixed with sufficient sodium hydroxide to attain and maintain a pH of 8 to 9. The solution was then refluxed for about one hour at atmospheric pressure. A condensation product of the formaldehyde with the 2,4,5-triamino-6-methoxy-pyrimidine was obtained. The solvent water and the water of condensation were removed in a vacuum distillation and a solid brittle resin was obtained.

Example II

One mol of 2,4,5-triamino-6-butoxy-pyrimidine and 4 mols of formaldehyde in a 37% solution in water were mixed with sufficient sodium hydroxide to attain and maintain a pH of 8 to 9. The solution was refluxed for one hour at atmospheric pressure. A condensation product of formaldehyde with 2,4,5-triamino-6-butoxy-pyrimidine was obtained. The solvent water and the water of condensation were removed from the mixture by vacuum distillation. A slightly yellow, solid and brittle resin was obtained.

Example III 100 parts of the dry resin made according to Example I was mixed with 100 parts of wood flour, and thoroughly ground together in a ball mill. The blended powder was placed into a disc mold and cured under pressure at 135° C. for 7 minutes. The disc produced was hard, non-brittle and had a glossy surface. It was found that the disc produced had dimensions almost exactly equal to those of the die used and that only infinitesimal shrinkage had occurred during curing and cooling.

Example IV

One mol of a resin produced as shown in Example I was dissolved in 6 mols of methanol. 0.1 mol of formic acid in aqueous solution was added to the methanol solution which was then heated at reflux temperature at atmospheric pressure for about one hour to produce a methanol solution of a trimethyl ether of trimethylol 2,4,5-amino-6-methoxy-pyrimidine. The excess methanol was removed by vacuum distillation to yield a slightly yellow clear liquid resin. The resin was soluble in organic solvents.

The ether resin could be cured to a solid insoluble infusible state by heating it at from 100° C. to 150° C. with or without the aid of an acid curing catalyst. The ether resin was compatible with alkyd resins to produce a high gloss coating composition having excellent weathering properties. It could be applied to textiles and cured thereon without the use of acid catalysts, to shrink-proof and crease-proof the fabrics and to greatly diminish chlorine absorption of the fabrics during subsequent bleaching operations.

Among the 2,4,5-triamino-6-alkoxy-pyrimidines that may be reacted according to the examples are the following:

2,4,5-triamino-6-methoxy-pyrimidine
2,4,5-triamino-6-ethoxy-pyrimidine
2,4,5-triamino-6-propoxy-pyrimidine
2,4,5-triamino-6-butoxy-pyrimidine
2,4,5-triamino-6-isopropoxy-pyrimidine The invention has been described in connection with the 2,4,5 - triamino - 6 - alkoxy pyridimines. However, 2,4,5-triamino-6-cyclohexoxy pyrimidine or 2,4,5-triamino-6-allyloxy pyrimidine may be used in place of the 2,4,5-triamino-6-alkoxy pyrimidine with satisfactory results.

The 2,4,5-triamino-6-alkoxy-pyrimidines may be conveniently prepared from 2,4-diamino-6-halo-pyrimidines by first reacting the halo-pyrimidine with a lower aliphatic alcohol in the presence of an alkali metal alcoholate in order to prepare the corresponding 2,4-diamino-6-alkoxy-pyrimidine. This product when reacted with nitrous acid at low temperature forms the corresponding 2,4-diamino-5-nitroso-6-alkoxy pyrimidine, which in turn may be suspended in a lower aliphatic alcohol and hydrogenated with hydrogen in order to form the desired 2,4,5-triamino-6-alkoxy-pyrimidine.

Aldehydes other than the formaldehyde of Examples I and II may be reacted with the 2,4,5-triamino-6-alkoxy-pyrimidines, or a mixture of aldehydes may be used. Among the useful aldehydes are formaldehyde, acetaldehyde, benzaldehyde, heptaldehyde, cinnamaldehyde, crotonaldehyde, acrolein, methacrolein, furfural, etc. The amount of aldehyde which will react with the 2,4,5-triamino-6-alkoxy pyrimidine may vary from less than 1 mol to about 6 mols per mol of 2,4,5-triamino-6-alkoxy-pyrimidine. An excess of aldehyde or aldehyde mixture beyond 6 mols may be used, the excess being removed after the reaction is complete.

The reaction medium may be either basic or acidic in nature although it is preferable to use a basic medium having a pH of between 8 and 9. At this pH, a better yield is obtained and the reaction is more easily controlled. The basic pH may be maintained with sodium or other alkali metal hydroxides or ammonium hydroxide. Other suitable alkaline compounds or buffers may be used if desired.

The resins thus obtained are slightly colored, fusible and soluble in alcohols, ketones, etc. They may be cured to an infusible state by heating them with or without an acid curing catalyst such as ethyl sulfonic acid at a temperature from about 100° C. to 200° C. An especially advantageous feature of the resins is the almost complete absence of shrinkage during the curing and cooling operations. This feature permits the preparation of molded articles within exceptionally close tolerances for precision molding uses.

The resins may be mixed before molding with other curable aminoplasts such as the aldehyde condensation products of urea, thiourea, dicyandiamide, the guanidines, the aminotriazines, e. g., melamine, guanamines, etc. to decrease the shrinkage of such aminoplasts during molding operations.

Conventional additives such as fillers, dyes, pigments, lubricants, etc., may be mixed with the new resins prior to the molding operations.

The aldehyde-condensation products of 2,4,5-triamino-6-alkoxy-pyrimidines may be further reacted with organic hydroxyl-containing bodies such as alcohols and phenols under acid conditions to provide liquid resins for the use in coating compositions alone or in combination with alkyd resins, and for use as textile or paper treating agents. Among the alcohols and phenols which may be used are methanol, ethanol, butanol, octanol, 2-ethyl hexanol, cetyl alcohol, stearyl alcohol, phenol, alkyl phenol, cresols, resorcinol, xyleneols, allyl alcohol, crotyl alcohol, benzyl alcohol, cinnamyl alcohol, etc. A mixture of two or more alcohols may be used in which case an excess of the lower alcohol is used first and then the higher alcohol or phenol is reacted for exchange of alcohol group.

The amount of alcohol used may vary according to the amount of aldehyde reacted with the 2,4,5-triamino-6-alkoxy-pyrimidine or may be substantially less than that amount. The maximum of alcohol or phenol which can be made to react is 6 mols per mol of the hexamethylol derivatives of the 2,4,5-triamino-6-alkoxy-pyrimidine.

According to another embodiment of this invention 2,4,5-triamino-6-alkoxy-pyrimidine may be reacted simultaneously with an aldehyde and an alcohol or phenol under acid conditions to produce ethers of the alkylol derivatives of 2,4,5-triamino-6-alkoxy-pyrimidines.

The ether resins obtained by either method are soluble in organic solvents. The resins are compatible with alkyd resins and are valuable for increasing the adhesion of alkyd resins to metal, glass, ceramics, etc. and diminishing the tendency of the alkyd resins to shrink away from coated surfaces. They also are valuable for treating textiles, to shrinkproof and creaseproof the textiles, to diminish the chlorine pick-up of the treated fabrics during subsequent bleaching operations, and to serve as fixing agents for dyestuffs.

It is obvious that many variations may be made in the processes and products of this invention without departing from the spirit and scope thereof as defined in the appended claims.

What is claimed is:

1. A thermosetting resin comprising the heat reaction product of 1 to 6 molar portions of an aldehyde with 1 molar portion of a pyrimidine taken from the group consisting of 2,4,5-triamino-6-alkoxy pyrimidines, 2,4,5-triamino-6-allyloxy pyrimidine and 2,4,5-triamino-6-cyclohexoxy pyrimidine.

2. A thermosetting resin as in claim 1 wherein the aldehyde is formaldehyde and the pyrimidine is 2,4,5-triamino-6-methoxy-pyrimidine.

3. A thermosetting resin as in claim 1 wherein the aldehyde is formaldehyde and the pyrimidine is 2,4,5-triamino-6-butoxy-pyrimidine.

4. A thermosetting resin comprising the heat reaction product of 1 to 6 molar portions of an aldehyde, 1 molar portion of a pyrimidine taken from the group consisting of 2,4,5-triamino-6-alkoxy pyrimidines, 2,4,5-triamino-6-allyloxy pyrimidine and 2,4,5-triamino-6-cyclohexoxy pyrimidine, and a compound taken from the group consisting of alcohols and phenols.

5. A thermosetting resin as in claim 4 wherein the aldehyde is formaldehyde, the pyrimidine is 2,4,5,-triamino-6-methoxy-pyrimidine, and the alcohol is methanol.

6. A process for preparing a thermosetting resin which comprises reacting 1 to 6 molar portions of an aldehyde with 1 molar portion of a pyrimidine taken from the group consisting of 2,4,5-triamino-6-alkoxy pyrimidines, 2,4,5-triamino-6-allyloxy pyrimidine and 2,4,5-triamino-6-cyclohexoxy pyrimidine.

7. A process for preparing a thermosetting resin which comprises reacting 1 to 6 molar portions of an aldehyde with 1 molar portion of a pyrimidine taken from the group consisting of 2,4,5-triamino-6-alkoxy pyrimidines, 2,4,5-triamino-6-allyloxy pyrimidine and 2,4,5-triamino-6-cyclohexoxy pyrimidine, at a pH of from 8 to 9.

References Cited in the file of this patent

UNITED STATES PATENTS

| | | |
|---|---|---|
| 2,211,709 | Zerweck | Aug. 13, 1940 |
| 2,211,710 | Zerweck | Aug. 13, 1940 |
| 2,223,327 | Light | Nov. 26, 1940 |
| 2,339,768 | D'Alelio | Jan. 25, 1944 |
| 2,379,691 | D'Alelio | July 3, 1945 |
| 2,584,024 | Kaczka | Jan. 29, 1952 |

FOREIGN PATENTS

| | | |
|---|---|---|
| 880,433 | France | Dec. 28, 1942 |
| 196,664 | Switzerland | June 16, 1938 |